UNITED STATES PATENT OFFICE.

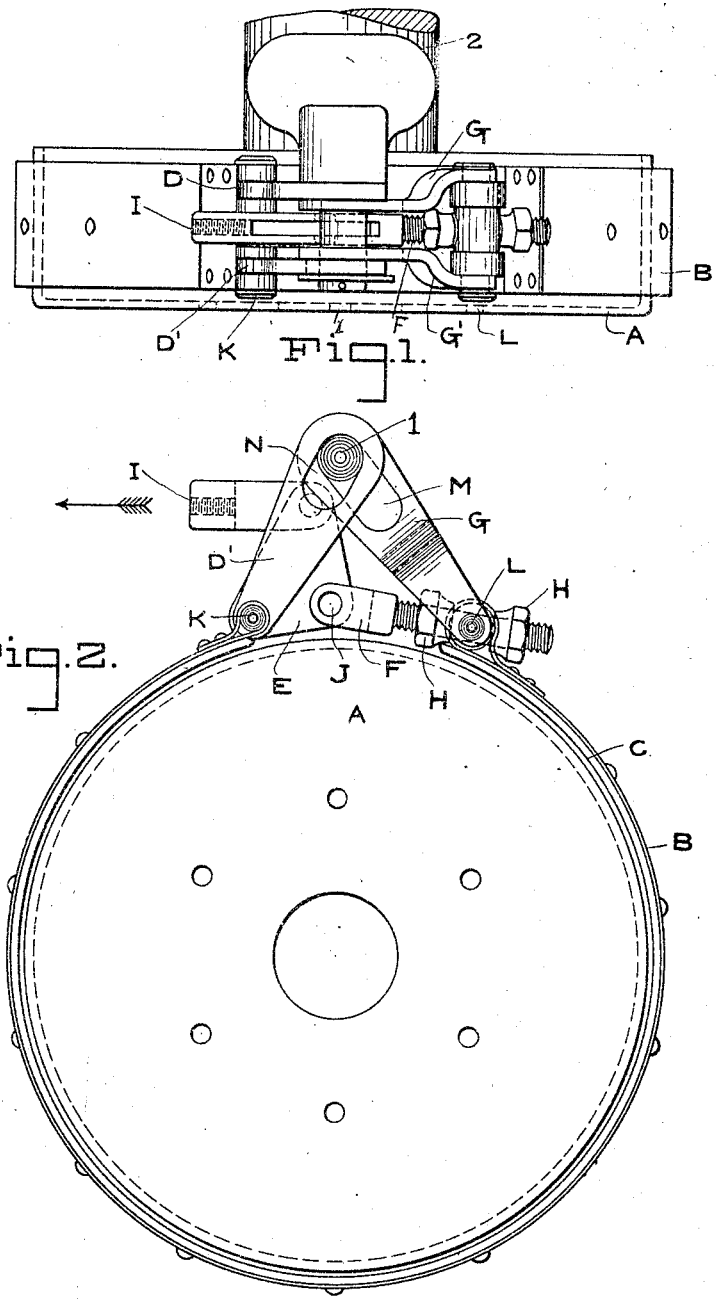

CARL H. BLOMSTROM, OF ADRIAN, MICHIGAN, ASSIGNOR TO ROYAL EQUIPMENT COMPANY, OF BRIDGEPORT, CONNECTICUT, A CORPORATION.

VEHICLE-BRAKE.

1,047,609.  Specification of Letters Patent.  Patented Dec. 17, 1912.

Application filed March 10, 1910. Serial No. 548,363.

*To all whom it may concern:*

Be it known that I, CARL H. BLOMSTROM, who am a citizen of the United States, residing at Adrian, county of Lenawee, State of Michigan, have invented a certain new and useful Improvement in Vehicle-Brakes, and declare the following to be a full, clear, and exact description of the same, such as will enable others skilled in the art to which it pertains to make and use the same, reference being had to the accompanying drawings, which form a part of this specification.

This invention relates to vehicle brakes, and has for its object an improved brake, in which the action of the setting lever is aided by the frictional engagement between the brake strap and the wheel to which the strap is applied, this being true in whichever direction the wheel be traveling at the time the brake is applied.

Figure 3:
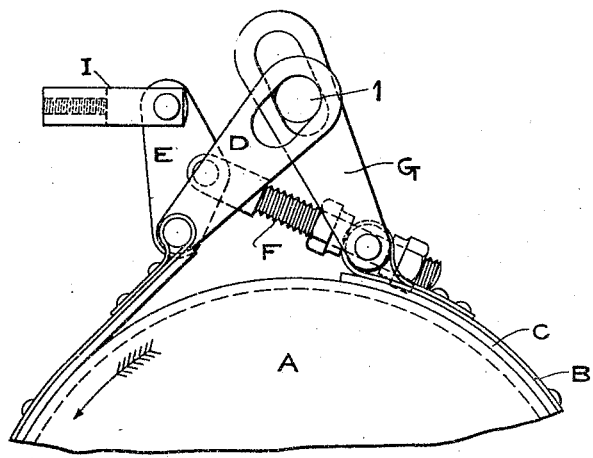
Figure 4:
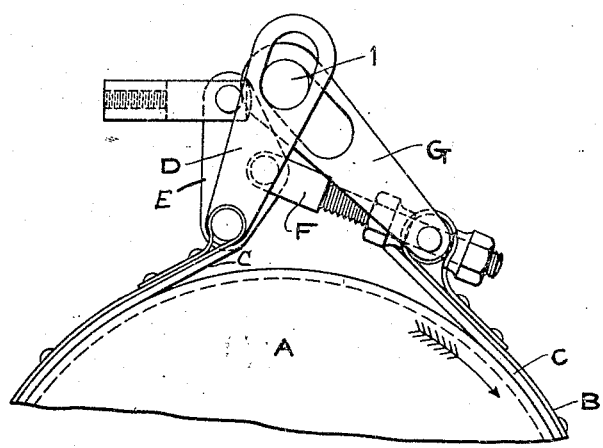

In the drawings:—Figure 1, is a plan view, Fig. 2, is a side elevation; the brake strap is shown loose. Fig. 3, is a side elevation; the brake is applied with the wheel having lefthand rotation. Fig. 4, is a side elevation; the brake is applied with the wheel, having a righthand rotation.

Referring to the drawing, A designates the brake disk, and B the brake band provided with the facing C. One end of said band is provided with eyes $k$ to receive and support a pivot rod K. The other end of said band is provided with similar ears $l$ arranged to receive and support a pivot bolt L. Pivotally connected to the bolt $k$ are links D, D', and similar links G, G' are pivoted to the bolt $l$, said links being provided with longitudinal slots N and M, respectively, to receive a supporting rod X. A lever E is also pivotally mounted on bolt $k$ and provided at its free end with a pivoted reach rod I. The bolt $l$ is provided with a transverse openings through which is passed the threaded end of a draw bolt F, the other end of said bolt being pivotally connected to lever E, as indicated at J. The bolt F extends between the links and is provided with suitable adjusting nuts H, H.

In practice, the operation of the brake is effected by changing the relative angular relation of the pivots K, J, and L. Assuming the wheel to be revolving to the left (Fig. 2) the end of band B carrying bolt F is slack and the rocking of lever E in the direction of the arrow tends to move the links D, D' away from support X until the ends of slots N engage said support and interrupt the movement. At the same time the tension on bolt F causes the links G, G' to move in the opposite direction and maintain a slack relation with respect to the support X. In this manner the friction facing C of band B is brought into close engagement with the disk A, thereby producing a very efficient braking action. If the disk is rotating in the opposite direction from that above described, a similar action takes place, the only difference being that the strain is brought upon links G, G', and the tension on links D, D' is relieved.

It will be noted that by reason of the construction above described the slotted ends of the links are at the top, thus permitting oscillation at the rod X rather than at the ends of the band B, and consequently a maximum play of draw bolt F is provided which insures a close engagement of the brake band with the disk A.

It will be observed that the shape of the lever E is such that the same is in effect a bell crank lever, the pivotal connection J of the screw F therewith being at the rear end of the base, and the rod I engaging the upper end and the pivot bolt K engaging the front end of the base of said lever. By the employment of this type of lever it will be clear that a compact structure is provided for the reason that less movements of the rod I and screw F are necessary to operate the band B.

By providing the links with slots in their upper ends and pivoting both links on one anchor stud, I secure an additional advantage, in that provision is made for considerable variation in distance between the top of the drum and the anchor stud, thus doing away with the necessity for longer links which require to be specially made, reducing the cost, and making it perfectly easy for the person attaching the brake, and permitting brakes to be used on machines and automobiles having a wide variation between the anchor stud and the top of the drum.

What I claim is:—

A brake comprising a brake drum, a band, an anchor stud, links each having one end pivotally connected to one end of said band, the other end of each link being slotted longitudinally to receive said anchor stud, whereby the distance between the brake drum and said stud may be varied, a bell crank lever having one of its arms pivotally connected to one end of said band, an adjusting screw connecting said arm and the other end of said band, and an operating rod pivotally connected to the other arm of said bell crank lever.

In testimony whereof, I sign this specification in the presence of two witnesses.

CARL H. BLOMSTROM.

Witnesses:
  VIRGINIA C. SPRATT,
  WILLIAM M. SWAN.